(No Model.)
A. LINDENBERG.
WINDING APPARATUS FOR MINES.
No. 302,504.  Patented July 22, 1884.
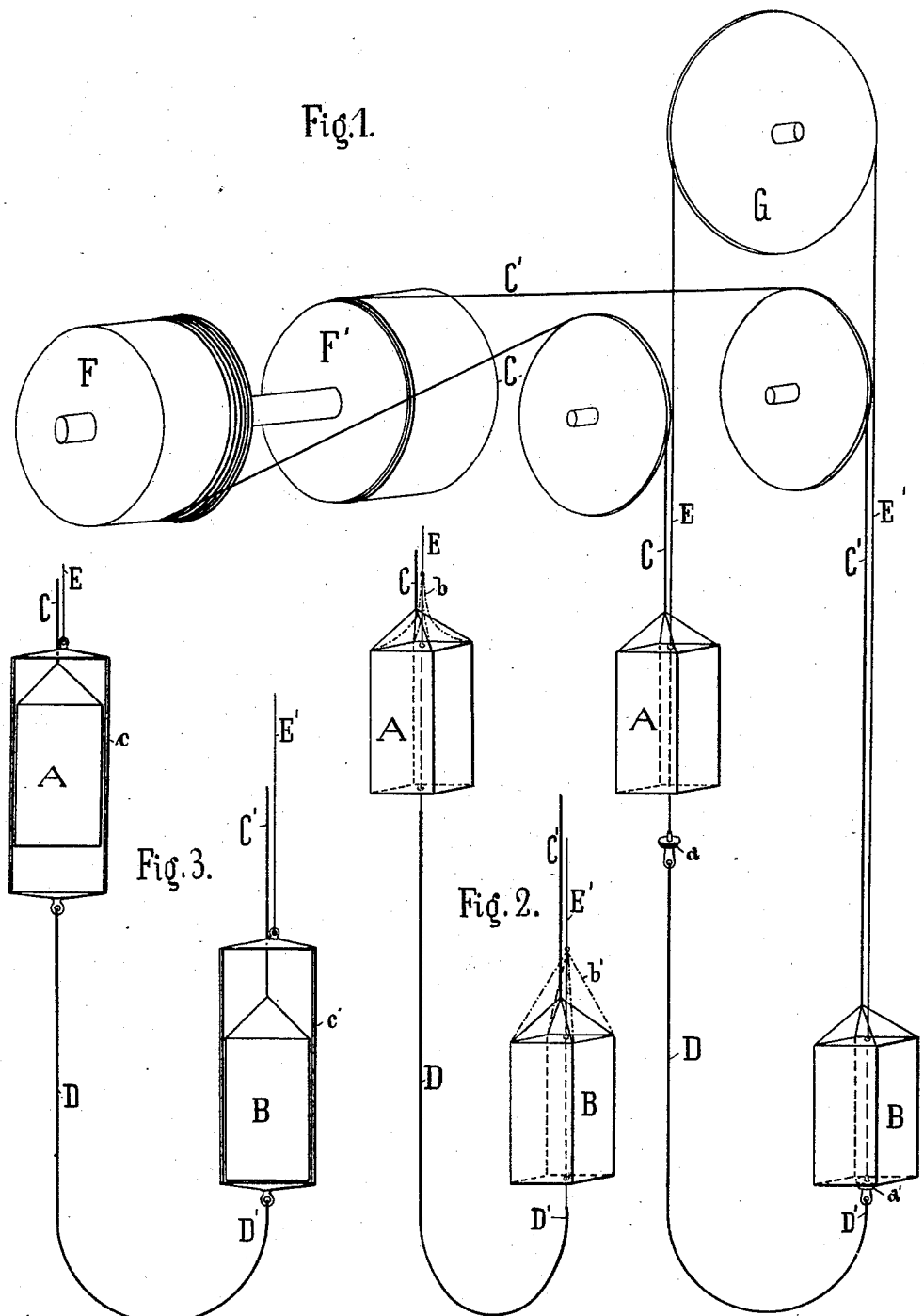

UNITED STATES PATENT OFFICE.

ARTHUR LINDENBERG, OF DORTMUND, PRUSSIA, GERMANY.

WINDING APPARATUS FOR MINES.

SPECIFICATION forming part of Letters Patent No. 302,504, dated July 22, 1884.

Application filed June 5, 1884. (No model.)

*To all whom it may concern:*

Be it known that I, ARTHUR LINDENBERG, residing in Dortmund, Kingdom of Prussia, Germany, have invented new and useful Improvements in Winding Apparatus for Mines, of which the following is a specification.

In the specification of my United States Letters Patent No. 295,774 I have described a new system of combining a counterbalance rope or chain with a winding apparatus, for the purpose of equalizing the resistance encountered by the winding-engine during its operation, the said rope or chain being so connected to the apparatus that its weight does not act on the winding-rope.

My present invention has for its object to attain the same purpose by means that are somewhat more simple than those referred to; and it consists in attaching the counterbalance-rope with its ends to the two ends of a thin suspension-rope carried by a separate sheave, and in providing the said ropes at or near their points of connection with means whereby the counterbalance-rope will act in upward direction upon the cage which is on the lower half of its course.

Figure 1 of the annexed sheet of drawings shows in perspective view one method of carrying out the invention. Fig. 2 is a like view of a portion of a winding apparatus with modified arrangement of parts. Fig. 3 is a front view of a portion of an apparatus with another modification of certain parts.

A and B are the two cages; C and C', the winding-ropes, passing in the ordinary manner over guiding-sheaves to the winding-drums F and F', the said sheaves and drums being shown in Fig. 1 only. D D' is the counterbalance-rope, instead of which, in all cases, a chain may be used.

As is shown by Fig. 1, the suspension-rope E E', running over and carried by the sheave G, and the counterbalance-rope, are so connected together as to form a continuous rope. The part E of the suspension-rope passes freely through the center of the cage A, and the part E' in like manner through the cage B. Below either cage there is fixed on the combined ropes a disk, (lettered $a$ for the parts D and E, and $a'$ for the parts D' and E',) and the bottom of each cage is so arranged as that the said disk may bear against the same.

In order to accurately balance the two winding-ropes, the weight per lineal foot of the counterbalance-rope must be equal to the sum of the like weights of a winding-rope and the suspension-rope. When the cage A is up and the cage B down, as shown in the drawings, the rope part D, being longer than D', will pull on the suspension-rope with a force dependent upon the difference of weight of the two ropes, and press the disk $a'$ from below against the cage B, so as to balance a part of its weight equal to the excess of weight of the hanging part of winding-rope C' over the weight of the like part of rope C. This pressure of the disk continues to act while the cage ascends through the lower half of its course; but the same decreases in the measure as the difference in length of the two rope parts D and D' becomes less, and when the two cages are opposite to each other the said pressure will cease, on account of the two parts D and D' balancing each other. Hereafter the cage A, which is descending, begins to bear against the disk $a$, and to exercise a pull on the suspension-rope, in consequence whereof the part D' of the counterbalance-rope will be drawn upward and become longer than D, while D becomes shorter, the increasing excess of weight due to the difference of length of the parts D and D' now acting to balance a portion of the cage A. The difference of weight of the two rope parts D and D' thus acts to relieve either winding-drum, F or F', of a portion of the weight of the corresponding cage equal to the excess of weight thrown on the drum by the greater length of the hanging part of the winding-rope attached to the same. The disks $a$ and $a'$ must be so fixed on the combined ropes D D' and E E', as that there will be a certain amount of play between the cage which is at the top or on the upper half of its course and the corresponding disk, the said play being requisite to prevent the suspension-rope from being exposed to any strain that might arise from unavoidable inaccuracies in the apparatus—such, for instance, as a slight difference in the diameters of the two winding-drums.

In the modified apparatus shown by Fig. 2, the disks $a$ and $a'$ are replaced by chains $b$ and $b'$, establishing a connection between the suspension-rope parts E E' and the top of the cages A B, respectively, the said chains having such length that those of the cage, being above the other one, will always be slack, in order to avoid a straining of the rope E E′ in this case as well as with the first arrangement.

The only difference in the operation of the modified construction, as compared with the one described first, is this, that while the disks $a$ and $a'$ press against the cages from below, the chains $b$ and $b'$ exercise a pull from above, the effect being in both cases the same. The said arrangements, requiring the suspension-rope to be carried through the center of the cages, are applicable only with cages adapted to receive two trucks by the side of each other.

For cages having room but for one truck the third arrangement (shown by Fig. 3) may be adopted, in which a frame, $c$ $c'$, respectively, is carried around the cage, the suspension-rope being attached to the top, the counterbalance-rope to the bottom of either frame, and the said frames being so constructed as that they may bear against the bottom of the cages, while they have sufficient play in vertical direction to avoid undue tension of the suspension-rope.

I claim as my invention—

In a winding apparatus for mines, the combination, with the cages, their winding-ropes, and the counterbalance rope or chain D D′, of the suspension-rope E E′, passing over the sheave G, and attached to the rope or chain D D′, and means, substantially as described, whereby the longer part of the said rope or chain D D′ acts through the suspension-rope in upward direction upon the cage which is on the lower half of its course, substantially as and for the purpose specified.

In testimony whereof I have signed my name to this specification in the presence of two subscribing witnesses.

ARTHUR LINDENBERG.

Witnesses:
 HENRY SPRINGMANN,
 B. ROI.